United States Patent
Bresnahan et al.

(10) Patent No.: US 10,476,783 B2
(45) Date of Patent: Nov. 12, 2019

(54) PACKET LOSS MITIGATION IN AN ELASTIC CONTAINER-BASED NETWORK

(71) Applicant: Cisco Technology, Inc., San Jose, CA (US)

(72) Inventors: Brian Patrick Bresnahan, Bedford, NH (US); Keith Burns, San Jose, CA (US); Jan Medved, Pleasanton, CA (US); Amit Singh, Woodside, CA (US)

(73) Assignee: Cisco Technology, Inc., San Jose, CA (US)

( * ) Notice: Subject to any disclaimer, the term of this patent is extended or adjusted under 35 U.S.C. 154(b) by 12 days.

(21) Appl. No.: 15/796,997

(22) Filed: Oct. 30, 2017

(65) Prior Publication Data
US 2019/0132237 A1    May 2, 2019

(51) Int. Cl.
*H04L 12/707* (2013.01)
*H04L 12/863* (2013.01)

(52) U.S. Cl.
CPC .............. *H04L 45/22* (2013.01); *H04L 47/54* (2013.01)

(58) Field of Classification Search
CPC .............................. H04L 45/22; H04L 47/54
See application file for complete search history.

(56) References Cited

U.S. PATENT DOCUMENTS

| | | | |
|---|---|---|---|
| 8,400,917 B2 | 3/2013 | Tripathi et al. |
| 9,462,427 B2 | 10/2016 | Patel et al. |
| 2016/0127184 A1 | 5/2016 | Bursell |
| 2016/0134557 A1 | 5/2016 | Steinder et al. |
| 2016/0212012 A1 | 7/2016 | Young et al. |
| 2017/0104608 A1 | 4/2017 | Sergeev et al. |

OTHER PUBLICATIONS

B. Sonkoly et al., "OpenFlow Virtualization Framework with Advanced Capabilities," Department of Telecommunications and Media Informatics, Budapest University of Technology and Economics, 6 pgs.

*Primary Examiner* — Curtis A Alia
(74) *Attorney, Agent, or Firm* — Merchant & Gould P.C.

(57) ABSTRACT

Packet loss mitigation may be provided. First, queue control data may be sent to a first container and then a route may be stalled after sending the queue control data. The route may correspond to a data path that leads to the first container. Next, modified queue control data may be received from the first container and the first container may be deleted safely with empty queues, preventing packet loss in response to receiving the modified queue control data.

20 Claims, 4 Drawing Sheets

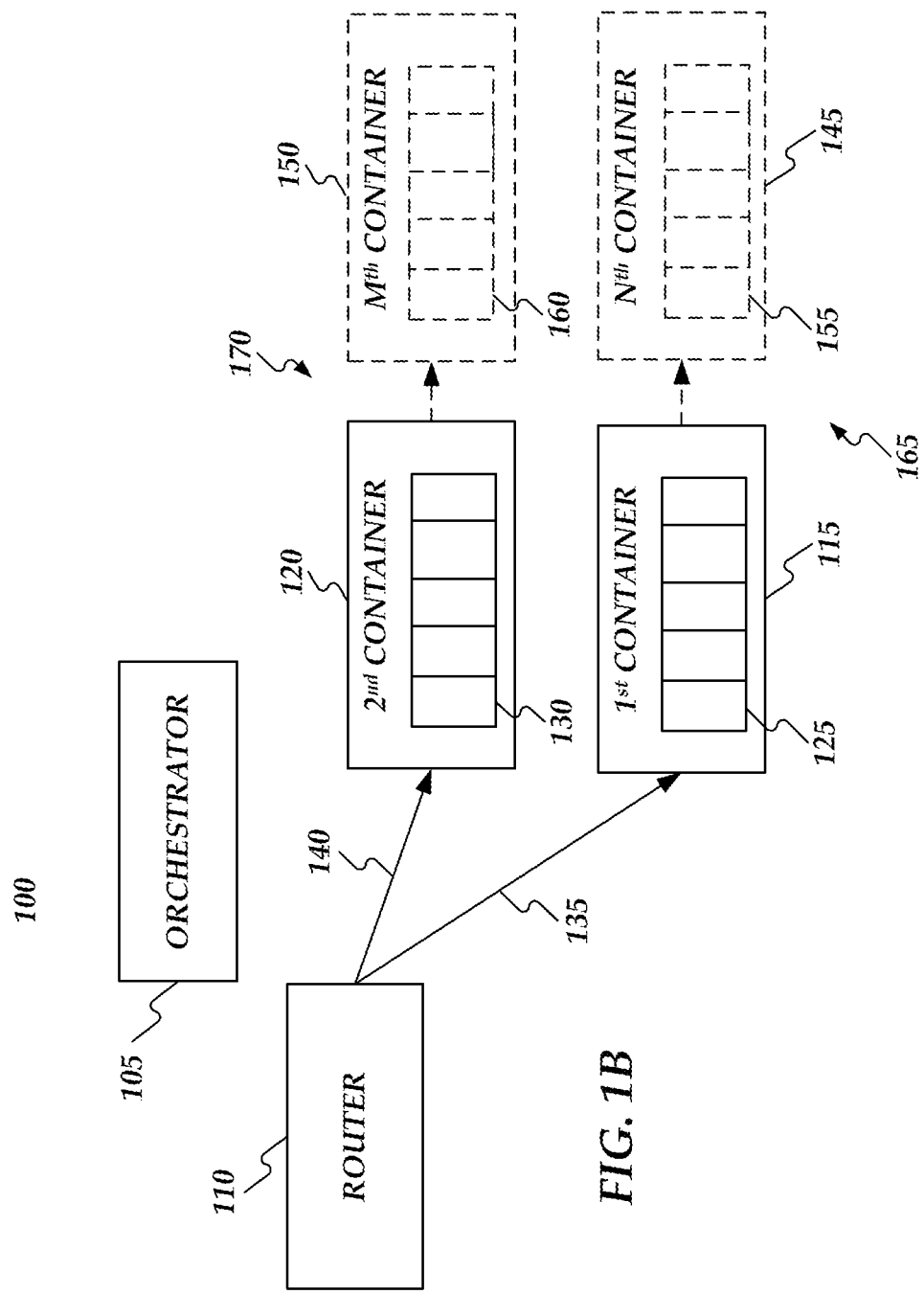

PACKET LOSS MITIGATION IN AN ELASTIC CONTAINER-BASED NETWORK

TECHNICAL FIELD

The present disclosure relates generally to packet loss mitigation in an elastic container-based network.

BACKGROUND

A computer network or data network is a telecommunications network that allows computers to exchange data. In computer networks, networked computing devices exchange data with each other using a data link. The connections between nodes are established using either cable media or wireless media. The best-known computer network is the Internet.

Network computer devices that originate, route, and terminate the data are called network nodes. Nodes can include hosts such as personal computers, phones, servers as well as networking hardware. Two such devices can be said to be networked together when one device is able to exchange information with the other device, whether or not they have a direct connection to each other. Computer networks differ in the transmission medium used to carry their signals, the communications protocols to organize network traffic, the network's size, topology, and organizational intent.

BRIEF DESCRIPTION OF THE FIGURES

The accompanying drawings, which are incorporated in and constitute a part of this disclosure, illustrate various embodiments of the present disclosure. In the drawings:

FIGS. 1A and 1B are block diagrams of a packet loss mitigation system;

DETAILED DESCRIPTION

Overview

Figure 1A:
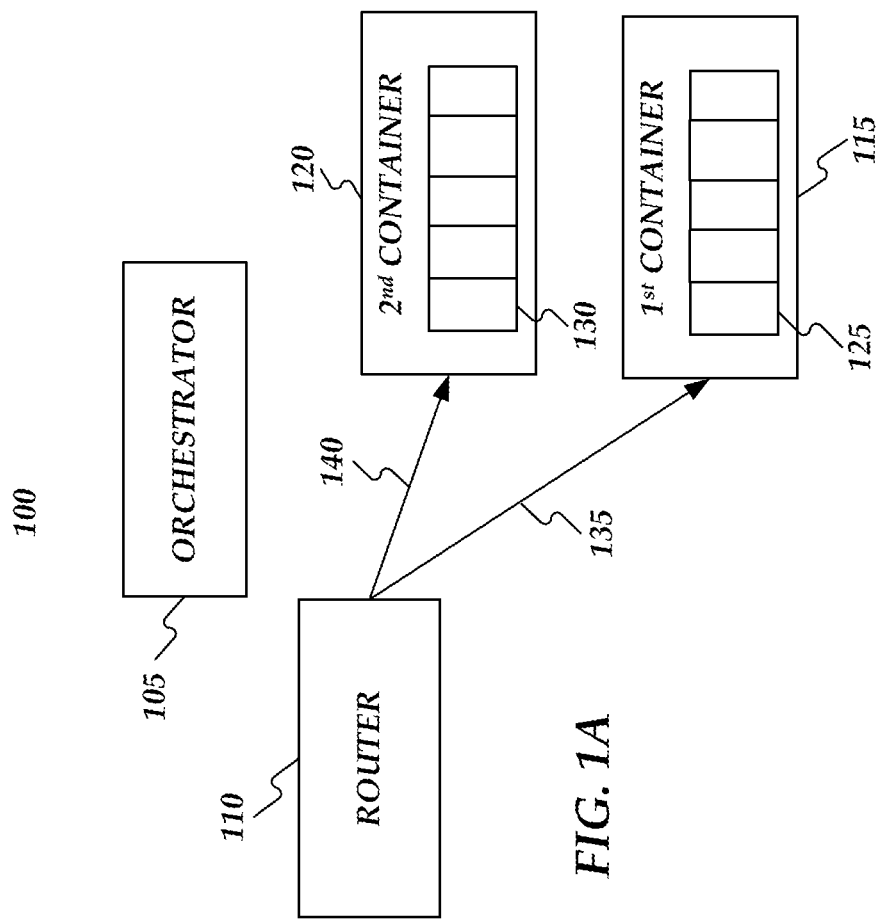

Packet loss mitigation may be provided. First, queue control data may be sent to a first container and then a route may be stalled after sending the queue control data. The route may correspond to a data path that leads to the first container. Next, modified queue control data may be received from the first container and the first container may be deleted in response to receiving the modified queue control data.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Embodiments of the disclosure may provide a network Queue Control Packet (QCP) for controlling container/process queues on orchestrated hosts in a packet network. With network virtualization, processes for managing process execution may be transferred to a network of servers. For example, a process and a queue may be used to process network packets where one or more processes may be managed in a container. The container may be replicated to distribute packet processing loads to multiple containers to increase throughput, which may be referred to as an elastic container. Moreover, a container and its processes and queues may be deleted or destroyed in such an elastic network, creating the possibility of packet loss.

FIG. 1A is a block diagram of a system 100 for providing packet loss mitigation. As shown in FIG. 1A, system 100 may comprise an orchestrator 105, a router 110, a first container 115, and a second container 120. Router 110 may comprise, but is not limited to, a switch. First container 115 may comprise a first container queue 125 and second container 120 may comprise a second container queue 130. A first container data path 135 may comprise a route from router 110 that corresponds to a data path that leads to first container 115. A second container data path 140 may comprise a route from router 110 that corresponds to a data path that leads to second container 120. First container 115 and second container 120 may comprise replicas.

FIG. 1B is a block diagram of system 100 for providing packet loss mitigation where multiple containers may be used in succession (i.e., series) to perform a process. As shown in FIG. 1B, system 100 may further comprise an Nth container 145 and an Mth container 150. Nth container 145 may comprise an Nth container queue 155 and may be in series with first container 115. Mth container 150 may comprise an Mth container queue 160 and may be in series with second container 120. First container 115 and Nth container 145 may form a first series of containers 165 and second container 120 and Mth container 150 may form a second series of containers 170. First series of containers 165 and second series of containers 170 may comprise replicas and may contain any number of containers.

Consistent with embodiments of the disclosure, orchestrator 105 and the containers (e.g., first container 115, second container 120, Nth container 145, and Mth container 150) may comprise software programming modules operating on the same or different servers located, for example, in a data center or data centers. Orchestrator 105 may oversee the adding and deleting of containers. Router 110 may route packets to the containers for processing. As described in greater detail below, a computing device 300 may comprise an example operating environment for any one or more of the aforementioned servers.

As shown in FIG. 1A and FIG. 1B, router 110 may be upstream of first container 115 and second container 120. Router 110 may use first container data path 135 to send packets downstream to first container 115 and second container data path 140 to send packets downstream to second container 120. First container 115 and second container 120 may be replicas and after a reduction in network load (or as part of a software upgrade of the containers), orchestrator 105 may determine to delete first container 115. During creation or deletion of a container, it is desirable that no packets be lost. However, during the deletion process in conventional systems, there could be packets in flight in first container queue 125 in first container 115. Simply destroying or deleting first container 115 may result in the loss of any in-flight packet or packets.

Embodiments of the disclosure may prevent packet loss by injecting a control message (e.g., a Queue Control Packet (QCP)) into the data path directed to an appropriate container or containers in the data path. Orchestrator 105 in the network may be the originator and receiver of this control message. FIG. 1A shows an example network with an orchestrator (e.g., orchestrator 105) and two containers (e.g., first container 115 and second container 120). First container data path 135 may be used to send packets to first container 115 and second container data path 140 may be used to send packets to second container 120. When orchestrator 105 decides to delete first container 115, embodiments of the disclosure may complete the packet processing in first container 115 and make second container 120 take over packet flows previously handled by first container 115 before deleting first container 115. An example of what fields the QCP packet may include may be described below. Embodiments of the disclosure are not limited to this example.

[Source Address]: address of the sender (e.g., orchestrator 105) of the QCP packet;

[Destination Address]: address of the destination of the QCP packet;

[Source Context Identification (ID)]: unique context ID that may be set by the sender;

[Stages to Live (STL)]: number of stages the QCP should go through before being returned to the sender; and

[Destination Context ID]: unique context ID that may be set by the consumer of the QCP.

Figure 2:
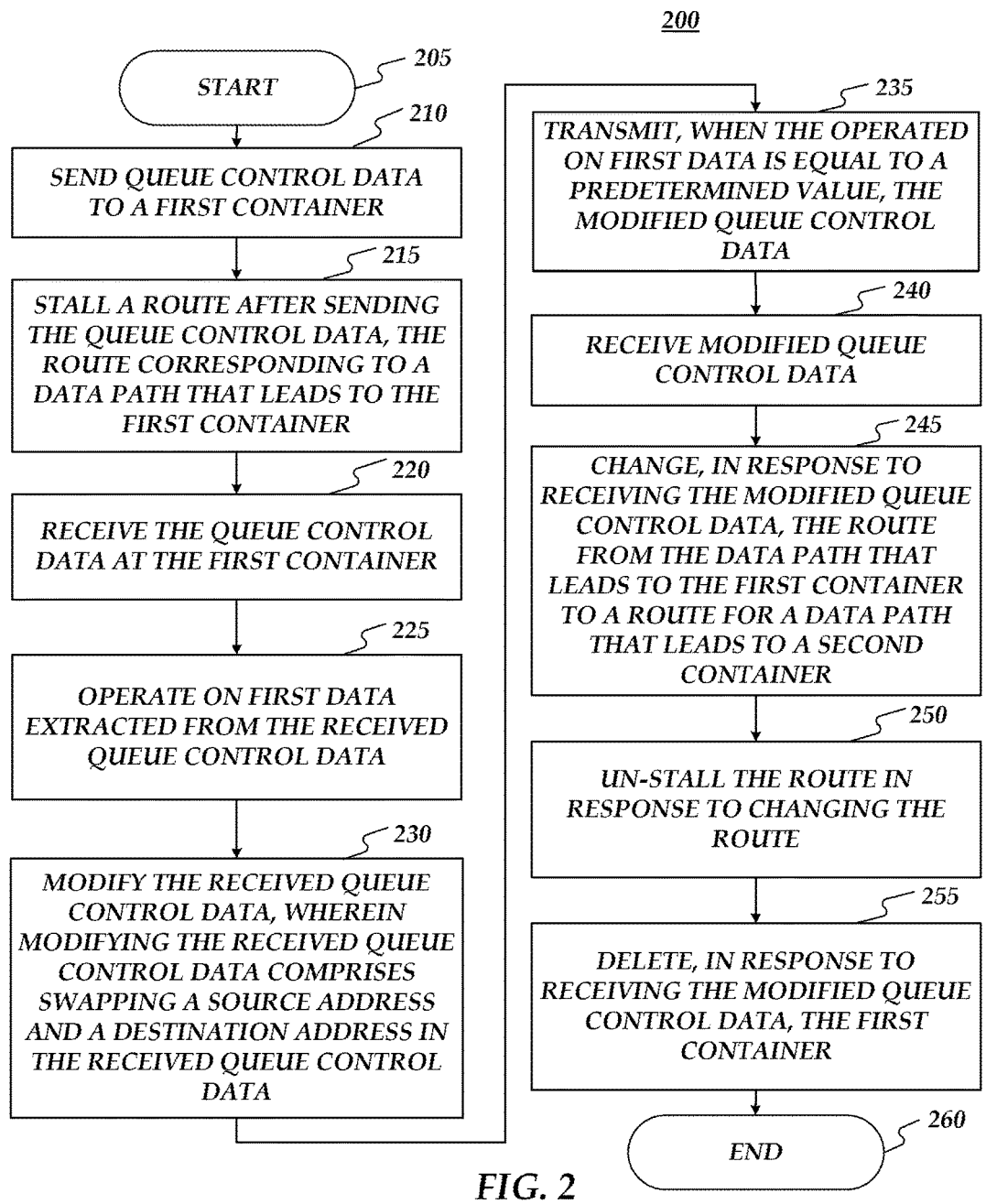
FIG. 2 is a flow chart of a method for providing packet loss mitigation.

FIG. 2 is a flow chart setting forth the general stages involved in a method 200 consistent with embodiments of the disclosure for providing packet loss mitigation. Method 200 may be implemented using, for example, orchestrator 105 or first container 115 operating on computing devices such as a computing device 300 as described in greater detail below with respect to FIG. 3. Ways to implement the stages of method 200 will be described in greater detail below.

Method 200 may begin at starting block 205 and proceed to stage 210 where orchestrator 105 may send queue control data to first container 115. The queue control data may comprise, for example, a QCP as described above. For example, orchestrator 105 may send a framed QCP into the data path (e.g., first container data path 135) to first container 115. A source address in the QCP may be the address (e.g., Internet Protocol (IP) address) of orchestrator 105. A destination address in the QCP may be the address (e.g., IP address) of first container 115. A source context ID in the QCP may comprise, for example, a unique integer allowing the orchestrator 105 to manage multiple QCP packets simultaneously. An STL in the QCP may be set to 1 in the FIG. 1A example because there may not be multiple containers (i.e., a series) used in succession.

From stage 210, where orchestrator 105 sends the queue control data to first container 115, method 200 may advance to stage 215 where orchestrator 105 may stall a route after sending the queue control data. The route may correspond to a data path (e.g., first container data path 135) that leads to first container 115. For example, orchestrator 105 may immediately stall first container data path 135 for the data path leading to first container 115 stopping packet flow to first container 115. Once orchestrator 105 sends the queue control data to first container 115 and immediately stalls the route after sending the queue control data in stage 215, method 200 may continue to stage 220 where first container 115 may receive the queue control data.

After first container 115 receives the queue control data in stage 220, method 200 may proceed to stage 225 where first container 115 may operate on first data extracted from the received queue control data. The first data extracted from the received queue control data may comprise data extracted from an STL field in the QCP. In this example, the first data may comprise the integer 1. For example, first container 115 may have a classifier (e.g., a logic module) that may classify traffic passing through and out of first container queue 125. Accordingly, the classifier may see the QCP packet type exit first container queue 125. In operating on the first data, first container 115 may decrement the first data. Because the result of the operation may be 0 in this example (e.g. FIG. 1A), which may be equal to a predetermined value, first container 115 may take the received queue control data (i.e., the QCP) out of the data path and process it as follows in stage 230 and stage 235.

Consistent with embodiments of the disclosure, a service chained environment may be used where multiple containers are connected in succession (i.e., a series) to process a packet in stages as shown in FIG. 1B. In this case, the STL can be used to control the packet through a fixed number of containers in a series. For example, the STL may be set to the number of containers in the series. If there are N containers in series of containers 165, the STL field in the QCP may be set to N. In this example, the STL may be 2. First container 115 may decrement the STL by 1 and pass it on the Nth container 145 where it may in turn be decremented by 1. Because the result of the operation at Nth container 145 on the STL may result in 0 in this example (e.g., FIG. 1B), which may be equal to the predetermined value, Nth container 145 may take the received queue control data (i.e., the QCP) out of the data path, process it as follows in stage 230 and stage 235.

From stage 225, where first container 115 operates on the first data extracted from the received queue control data, method 200 may advance to stage 230 where first container 115 may modify the received queue control data. Modifying the received queue control data may comprise swapping a source address and a destination address in the received queue control data. For example, first container 115 may swap the source address (IP address of orchestrator 105) and destination addresses (IP address of first container 115) in the QCP. In addition, first container 115 may write a context into the destination context ID field of the QCP.

Once first container 115 modifies the received queue control data in stage 230, method 200 may continue to stage 235 where first container 115 may transmit the modified queue control data (i.e., the QCP) when the operated on first data is equal to a predetermined value. For example, because the operation result may be 0 in this example (which may be equal to the predetermined value), first container 115 may take the modified queue control data (i.e., the QCP with the aforementioned addresses swapped) out of the data path and may forward the modified QCP into the packet network.

After first container 115 transmits the modified queue control data in stage 235, method 200 may proceed to stage 240 where orchestrator 105 may receive the modified queue control data. For example, the modified QCP may be received back at orchestrator 105. Orchestrator 105 may extract the source context ID out of the QCP packet and may use it to determine the state of the route adjustment as it may have many QCP packets in flight at any point in time. The presence of this QCP being back at orchestrator 105 may indicate to the orchestrator 105 that first container queue 125 in first container 115 is now empty.

From stage 240, where orchestrator 105 receives the modified queue control data, method 200 may advance to stage 245 where orchestrator 105 may change, in response to receiving the modified queue control data, the route from the data path that leads to first container 115 (i.e., first container data path 135) to a route for a data path that leads to second container 120 (i.e., second container data path 140). For example, orchestrator 105 may change the route of the packet path formerly going to first container 115 to now go to second container 120.

Once orchestrator 105 changes the route in stage 245, method 200 may continue to stage 250 where orchestrator 105 may un-stall and modify the route in response to changing the route. For example, orchestrator 105 may re-enable the route for the data flow and the data flow that previously would have gone to first container 115, may now go to second container 120.

After orchestrator 105 un-stalls the route in stage 250, method 200 may proceed to stage 255 where orchestrator 105 may delete, in response to receiving the modified queue control data, first container 115 and its empty queues, which may prevent packet loss in the elastic container network. For example, orchestrator 105 may now safely delete first container 115 without packet loss in the network. Accordingly, embodiments of the disclosure may prevent packet loss by injecting a QCP into the data path in appropriate containers in the data path. Consequently, the goal of zero packet loss may be achieved by using the QCP. Once orchestrator 105 deletes first container 115 in stage 255, method 200 may then end at stage 260.

Figure 3:
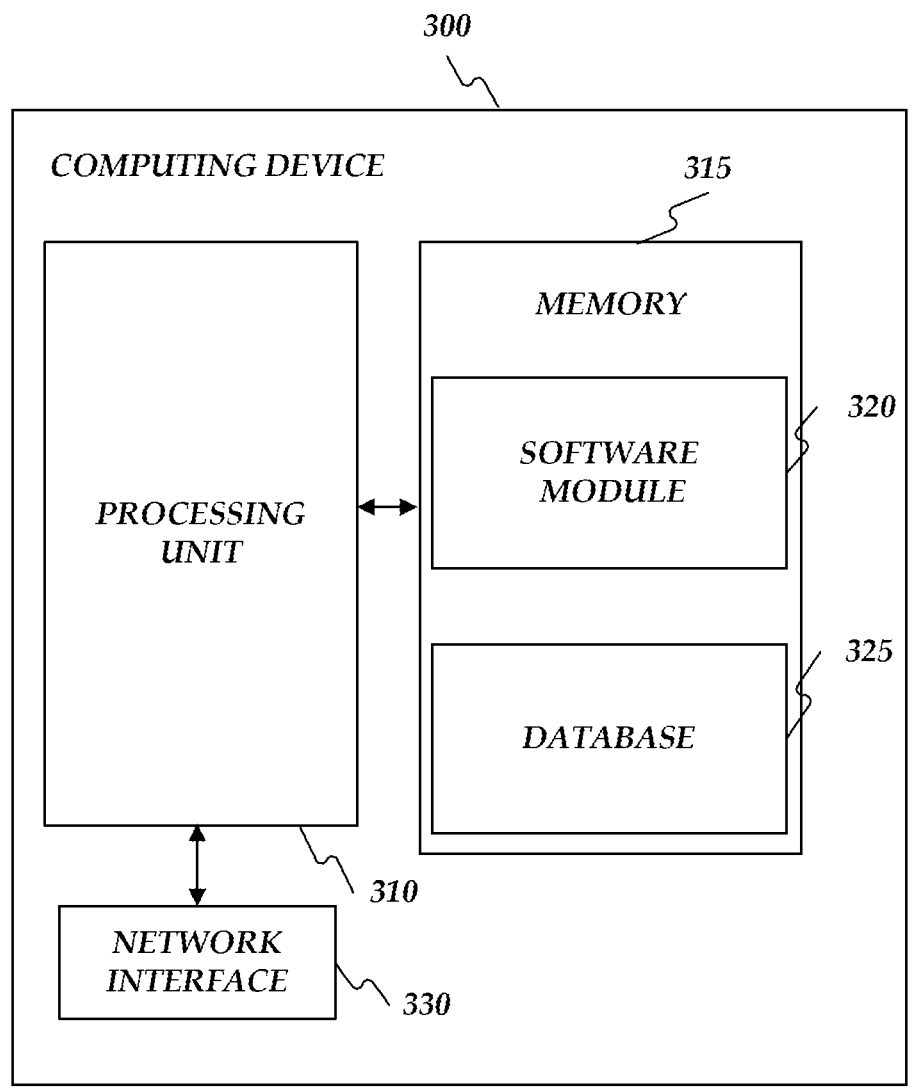
FIG. 3 is a block diagram of a computing device.

FIG. 3 shows computing device 300. As shown in FIG. 3, computing device 300 may include a processing unit 310 and a memory unit 315. Memory unit 315 may include a software module 320 and a database 325. Computing device 300 may further comprise a network interface configured to connect computing device to a network. While executing on processing unit 310, software module 320 may perform, for example, processes for providing packet loss mitigation, including for example, any one or more of the stages from method 200 described above with respect to FIG. 2. Computing device 300, for example, may provide an operating environment for orchestrator 105 and the containers (e.g., first container 115, second container 120, Nth container 145, and Mth container 150). Orchestrator 105 and the containers (e.g., first container 115, second container 120, Nth container 145, and Mth container 150) may operate in other environments and are not limited to computing device 300.

Computing device 300 may be implemented using a cable modem, a cellular base station, a tablet device, a mobile device, a smart phone, a telephone, a remote control device, a set-top box, a digital video recorder, a personal computer, a network computer, a mainframe, a router, a switch, or other similar microcomputer-based device. Computing device 300 may comprise any computer operating environment, such as hand-held devices, multiprocessor systems, microprocessor-based or programmable sender electronic devices, minicomputers, mainframe computers, and the like. Computing device 300 may also be practiced in distributed computing environments where tasks are performed by remote processing devices. The aforementioned systems and devices are examples and computing device 300 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example, but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 500 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
    sending queue control data to a first container;
    stalling a route after sending the queue control data, the route corresponding to a data path that leads to the first container;
    receiving modified queue control data, wherein the queue control data is modified by swapping a source address and a destination address in the queue control data;
    deleting, in response to receiving the modified queue control data, the first container;
    changing, in response to receiving the modified queue control data, the route from the data path that leads to the first container to another route for another data path that leads to a second container; and
    un-stalling the route in response to changing the route.

2. The method of claim 1, wherein sending the queue control data comprises sending the queue control data comprising a queue control packet (QCP).

3. The method of claim 1, wherein sending the queue control data comprises sending the queue control data comprising a QCP wherein the QCP comprises a stages to live field comprising first data corresponding to a number of containers that the QCP must go through before being returned.

4. The method of claim 1, wherein sending the queue control data comprises sending the queue control data comprising a QCP wherein the QCP comprises a source identification (ID) field configured to uniquely identify the QCP.

5. The method of claim 1, wherein sending the queue control data comprises sending the queue control data comprising a QCP wherein the QCP comprises a destination identification (ID) field configured to uniquely identify a consumer of the QCP.

6. The method of claim 1, wherein changing the route from the data path that leads to the first container to the another route for the another data path that leads to the second container comprises changing the route wherein the first container and the second containers are replicas.

7. The method of claim 1, further comprising:
    receiving the queue control data at the first container;
    operating on first data extracted from the received queue control data;
    transmitting, when the operated on first data is equal to a predetermined value, the modified queue control data.

8. The method of claim 7, further comprising passing the queue control data through a series of containers wherein:
    receiving the queue control data at the first container comprises receiving the queue control data at the first container in the series of containers; and
    operating on the first data extracted from the received queue control data comprises operating, at each container in the series of container, on the first data extracted from the received queue control data.

9. The method of claim 1, wherein modifying the received queue control data comprises modifying the received queue control data when the operated on first data is equal to the predetermined value.

10. A method comprising:
    receiving queue control data;
    operating on first data extracted from the received queue control data;
    modifying the received queue control data, wherein modifying the received queue control data comprises swapping a source address and a destination address in the received queue control data;
    transmitting, when the operated on first data is equal to a predetermined value, the modified queue control data;
    changing, in response to receiving the modified queue control data, the route from the data path that leads to the first container to another route for another data path that leads to a second container; and
    un-stalling the route in response to changing the route.

11. The method of claim 10, wherein modifying the received queue control data comprises modifying the received queue control data when the operated on first data is equal to a predetermined value.

12. The method of claim 10, further comprising passing the queue control data through a series of containers wherein:
    receiving the queue control data comprises receiving the queue control data at a first container in the series of containers; and
    operating on the first data extracted from the received queue control data comprises operating, at each container in the series of container, on the first data extracted from the received queue control data.

13. The method of claim 10, wherein receiving the queue control data comprises receiving the queue control data comprising a queue control packet (QCP).

14. The method of claim 10, wherein receiving the queue control data comprises receiving the queue control data comprising a QCP wherein the QCP comprises a stages to live field comprising first data corresponding to a number of containers that the QCP must go through before being returned.

15. The method of claim 10, wherein receiving the queue control data comprises receiving the queue control data comprising a QCP wherein the QCP comprises a source identification (ID) field configured to uniquely identify the QCP.

16. The method of claim 10, wherein receiving the queue control data comprises receiving the queue control data comprising a QCP wherein the QCP comprises a destination identification (ID) field configured to uniquely identify a consumer of the QCP.

17. A system comprising:

a memory storage; and a processing unit coupled to the memory storage, wherein the processing unit is operative to:
- send queue control data to a first container;
- stall a route after sending the queue control data, the route corresponding to a data path that leads to the first container;
- receive modified queue control data; and
- delete, in response to receiving the modified queue control data, the first container;
- change, in response to receiving the modified queue control data, the route from the data path that leads to the first container to another route for another data path that leads to a second container; and
- un-stall the route in response to changing the route.

18. The system of claim 17, wherein the first container and the second containers are replicas.

19. The system of claim 17, wherein the queue control data comprises a queue control packet (QCP).

20. The system of claim 17, wherein the queue control data comprises a QCP, and wherein the QCP comprises a destination identification (ID) field configured to uniquely identify a consumer of the QCP.

* * * * *